United States Patent
Kochura (10) Patent No.: US 9,280,321 B2
(45) Date of Patent: *Mar. 8, 2016

(54) DISTRIBUTING UI CONTROL EVENTS FROM A SINGLE EVENT PRODUCER ACROSS MULTIPLE SYSTEMS EVENT CONSUMERS

(71) Applicant: INTERNATIONAL BUSINESS MACHINES CORPORATION, Armonk, NY (US)

(72) Inventor: Nadiya Kochura, Bolton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/683,446

(22) Filed: Apr. 10, 2015

(65) Prior Publication Data

US 2016/0044135 A1    Feb. 11, 2016

Related U.S. Application Data

(63) Continuation of application No. 14/456,210, filed on Aug. 11, 2014.

(51) Int. Cl.
G06F 9/44        (2006.01)
(52) U.S. Cl.
CPC ........................................ *G06F 8/20* (2013.01)
(58) Field of Classification Search
USPC .................................. 717/100–109; 715/700
IPC ..................................... G06F 3/48,220/86, 8/20
See application file for complete search history.

(56) References Cited

U.S. PATENT DOCUMENTS

| 6,226,787 B1 | 5/2001 | Serra et al. |
| 6,505,342 B1 | 1/2003 | Hartmann et al. |
| 6,708,327 B1 | 3/2004 | Aliphas |
| 6,938,245 B1 | 8/2005 | Spertus et al. |

(Continued)

FOREIGN PATENT DOCUMENTS

| EP | 1612677 A2 | 1/2006 |
| WO | 9419752 A1 | 9/1994 |

OTHER PUBLICATIONS

Hilbert et al, "Extracting Usability Information from User Interface Events", ACM Computing Surveys, vol. 32, No. 4, pp. 384-421, 2000.*

(Continued)

*Primary Examiner* — Anil Khatri
(74) *Attorney, Agent, or Firm* — Law Office of Jim Boice (57) ABSTRACT

A method, system, and/or computer program product distributes a user interface (UI) initiated system event, from a single producer of the UI-initiated system event, across multiple systems event consumers on multiple execution environments. An operating system (OS) event receiver in a server receives a user interface (UI) initiated system event on the server. In response to the OS event receiver receiving the UI-initiated system event, the UI-initiated system event is recorded and published, via messages, to multiple systems event consumers on multiple execution environments, where each message directs a receiving execution environment adapter to locally replicate and execute the UI-initiated system event from the server on each of the multiple execution environments.

10 Claims, 4 Drawing Sheets

(56) References Cited

U.S. PATENT DOCUMENTS

| | | | |
|---|---|---|---|
| 7,010,782 B2 | 3/2006 | Narayan et al. | |
| 7,055,136 B2 | 5/2006 | Dzoba et al. | |
| 7,076,762 B2* | 7/2006 | Fisher | G06F 8/72 717/102 |
| 7,340,714 B2 | 3/2008 | Upton | |
| 7,350,184 B2* | 3/2008 | Upton | G06F 9/541 345/581 |
| 7,428,723 B2* | 9/2008 | Greene | G06Q 10/063112 709/201 |
| 7,430,732 B2 | 9/2008 | Cwalina et al. | |
| 7,509,629 B2* | 3/2009 | Sakamoto et al. | 717/105 |
| 7,613,789 B2* | 11/2009 | Cacenco | G06F 8/34 709/218 |
| 7,624,375 B2* | 11/2009 | Santori | G06F 8/38 715/717 |
| 7,793,261 B1 | 9/2010 | Edwards et al. | |
| 7,831,962 B2 | 11/2010 | Banerjee et al. | |
| 7,895,566 B2* | 2/2011 | Shenfield | G06F 8/20 717/106 |
| 7,908,580 B2* | 3/2011 | Stubbs et al. | 717/100 |
| 7,913,228 B2 | 3/2011 | Ericsson et al. | |
| 7,934,194 B2* | 4/2011 | Kinnucan, Jr. | G06F 8/10 715/713 |
| 7,937,685 B2* | 5/2011 | Weil et al. | 717/103 |
| 7,971,180 B2* | 6/2011 | Kreamer | G06Q 10/06 717/101 |
| 7,971,184 B2* | 6/2011 | Grechanik et al. | 717/107 |
| 8,117,597 B2 | 2/2012 | Shia | |
| 8,122,426 B2* | 2/2012 | Isom | 717/103 |
| 8,191,039 B2* | 5/2012 | Cacenco | G06F 8/34 717/106 |
| 8,196,096 B2* | 6/2012 | Falzone Schaw et al. | 717/109 |
| 8,201,150 B2 | 6/2012 | Ghiloni et al. | |
| 8,230,386 B2* | 7/2012 | Sedukhin | G06F 11/3612 717/100 |
| 8,244,806 B2 | 8/2012 | Arthur et al. | |
| 8,261,231 B1* | 9/2012 | Hirsch | G06F 8/20 709/201 |
| 8,281,046 B2* | 10/2012 | Wolff-Petersen et al. | 710/8 |
| 8,352,905 B2* | 1/2013 | Chouinard | G06F 8/20 717/100 |
| 8,365,144 B1* | 1/2013 | Webb | 717/109 |
| 8,365,149 B2 | 1/2013 | Frank et al. | |
| 8,397,205 B2* | 3/2013 | Kornerup et al. | 717/100 |
| 8,448,138 B2 | 5/2013 | Chang et al. | |
| 8,468,502 B2 | 6/2013 | Lui et al. | |
| 8,555,238 B2* | 10/2013 | White | G06F 8/30 709/223 |
| 8,572,579 B2 | 10/2013 | Ashish et al. | |
| 8,745,572 B2* | 6/2014 | Zimmermann et al. | 717/101 |
| 8,943,423 B2* | 1/2015 | Merrill et al. | 715/762 |
| 2011/0225566 A1 | 9/2011 | Muharsky et al. | |

OTHER PUBLICATIONS

Liu et al, "A Visual Language and Environment for Specifying User Interface Event Handling in Design Tools ", ACM, pp. 87-94, 2007.*
Navarre et al, "Model Model-Based Dynamic Distribution of User Interfaces of Critical Interactive Systems", ACM, pp. 66-75, 2013.*
Schöbel et al, "A Runtime Environment for Online Processing of Operating System Kernel Events", ACM, pp. 1-7, 2009.*
Zellweger et al, "Unifying Synchronization and Events in a Multicore OS", ACM, pp. 1-6, 2012.*
Cao et al, "Demo Abstract: Faithful Reconstruction of Application Behavior based on Event Traces in the LiteOS Operating System", IEEE, pp. 549-550, 2008.*
List of IBM Patents or Patent Application Treated as Related—Apr. 16, 2015, pp. 1-2.
Branton et al., "Toward Rapid and Iterative Development of Tangible, Collaborative, Distributed User Interfaces", ACM, pp. 239-248, 2013.
Rusnak et al., "User-aware Distributed User Interface for Tiled-display Environments", ACM, pp. 1-4, 2014.
Melchior et al., "A Model-based Approach for Distributed User Interfaces", ACM, pp. 11-20, 2011.
Degwekar et al., "Event-triggered Data and Knowledge Sharing Among Collaborating Government Organizations", ACM, pp. 102-111, 2007.

* cited by examiner

DISTRIBUTING UI CONTROL EVENTS FROM A SINGLE EVENT PRODUCER ACROSS MULTIPLE SYSTEMS EVENT CONSUMERS

BACKGROUND

The present disclosure relates to the field of computers that support user interfaces, and specifically to the use of computers that are networked. Still more particularly, the present disclosure relates to distributing user-interface based control events to other computers on a network.

SUMMARY

A method, system, and/or computer program product distributes a user interface (UI) initiated system event, from a single producer of the UI-initiated system event, across multiple systems event consumers on multiple execution environments. An operating system (OS) event receiver in a server receives a user interface (UI) initiated system event on the server. In response to the OS event receiver receiving the UI-initiated system event, the UI-initiated system event is recorded and published, via messages, to multiple systems event consumers on multiple execution environments, where each message directs a receiving execution environment adapter to locally replicate and execute the UI-initiated system event from the server on each of the multiple execution environments.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
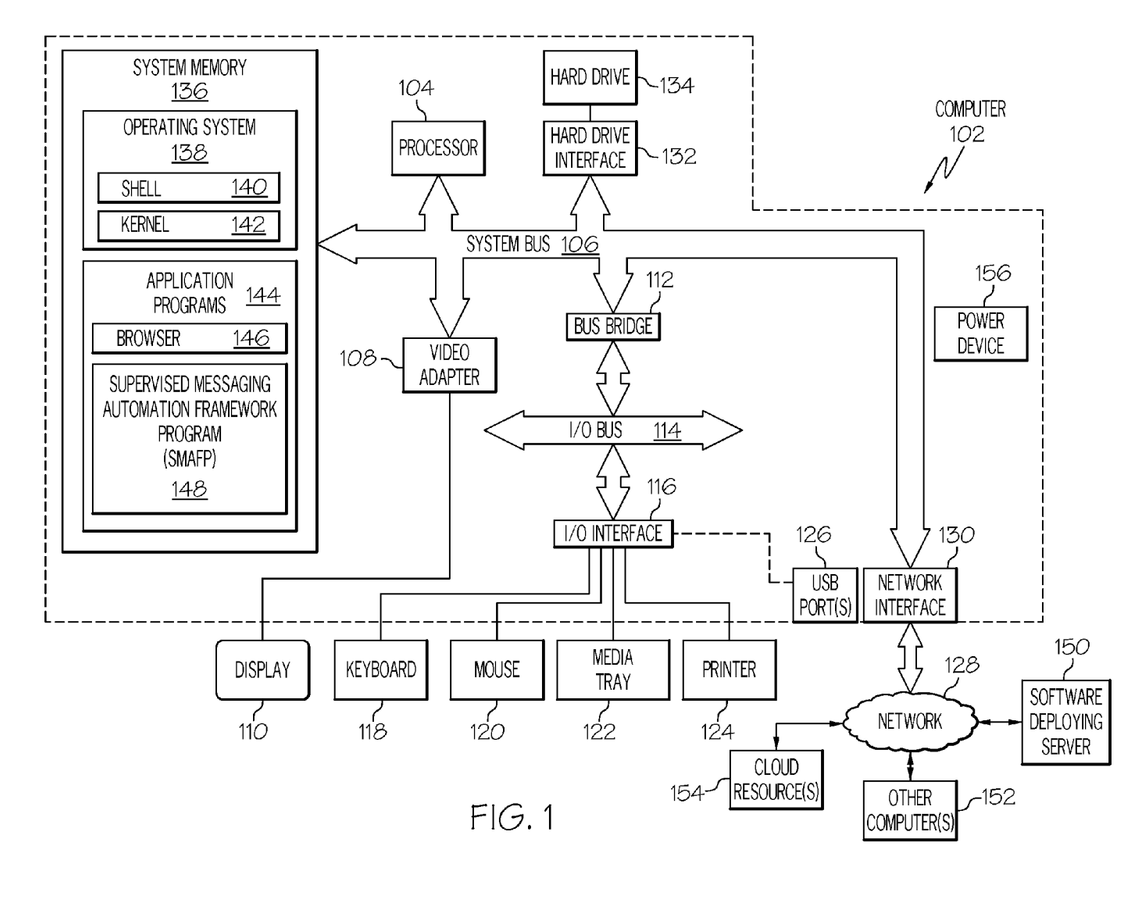
FIG. 1 depicts an exemplary system in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152 and/or cloud resource(s) 154 shown in FIG. 1, and/or the master computer 204 and/or system event controller 208 and/or system event adapter 212 and/or client system Operating System (OS) queue 214 and/or client computers 216a-216n shown in FIG. 2.

Examples of cloud resources 154 include, but are not limited to, hardware devices such as servers, communication devices, networks, storage drives, etc., as well as software resources such as operating systems and applications. Certain applications are provided on a cloud, and thus are known as cloud hosted applications. A "cloud" is a distributed set of shared resources, which includes hardware, software, networks, communication links, and other information processing systems in a distributed, on-demand basis. The shared hardware resources are connected through communication networks that include, but are not limited to, a Local Area Network (LAN), a Wide Area Network (WAN), and the Internet. A LAN is a computer network that interconnects computers within a limited area, such as a campus of a company, a school, a home, etc. A WAN is a computer network that covers a much larger area, including cities, states, countries, and even the entire world. The Internet is similar to a WAN, but is actually an interconnection of networks, each of which has their own hardware/software resources.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Supervised Messaging Automation Framework Program (SMAFP) 148. SMAFP 148 includes code for implementing the processes described below, including those described in FIGS. 2-4. In one embodiment, computer 102 is able to download SMAFP 148 from software deploying server 150, including in an on-demand basis, wherein the code in SMAFP 148 is not downloaded until needed for execution. Note further that, in one embodiment of the present invention, software deploying server 150 performs all of the functions associated with the present invention (including execution of SMAFP 148), thus freeing computer 102 from having to use its own internal computing resources to execute SMAFP 148.

Power is provided to one or more of the components depicted in computer 102 from a power device 156. In various embodiments, power device 156 includes a transformer for lowering/raising incoming voltage (e.g., from a power source—not shown), a converter for converting incoming power from one format into another (i.e., converting alternating current into direct current), power storage devices for storing power (i.e., batteries, capacitors, etc.), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
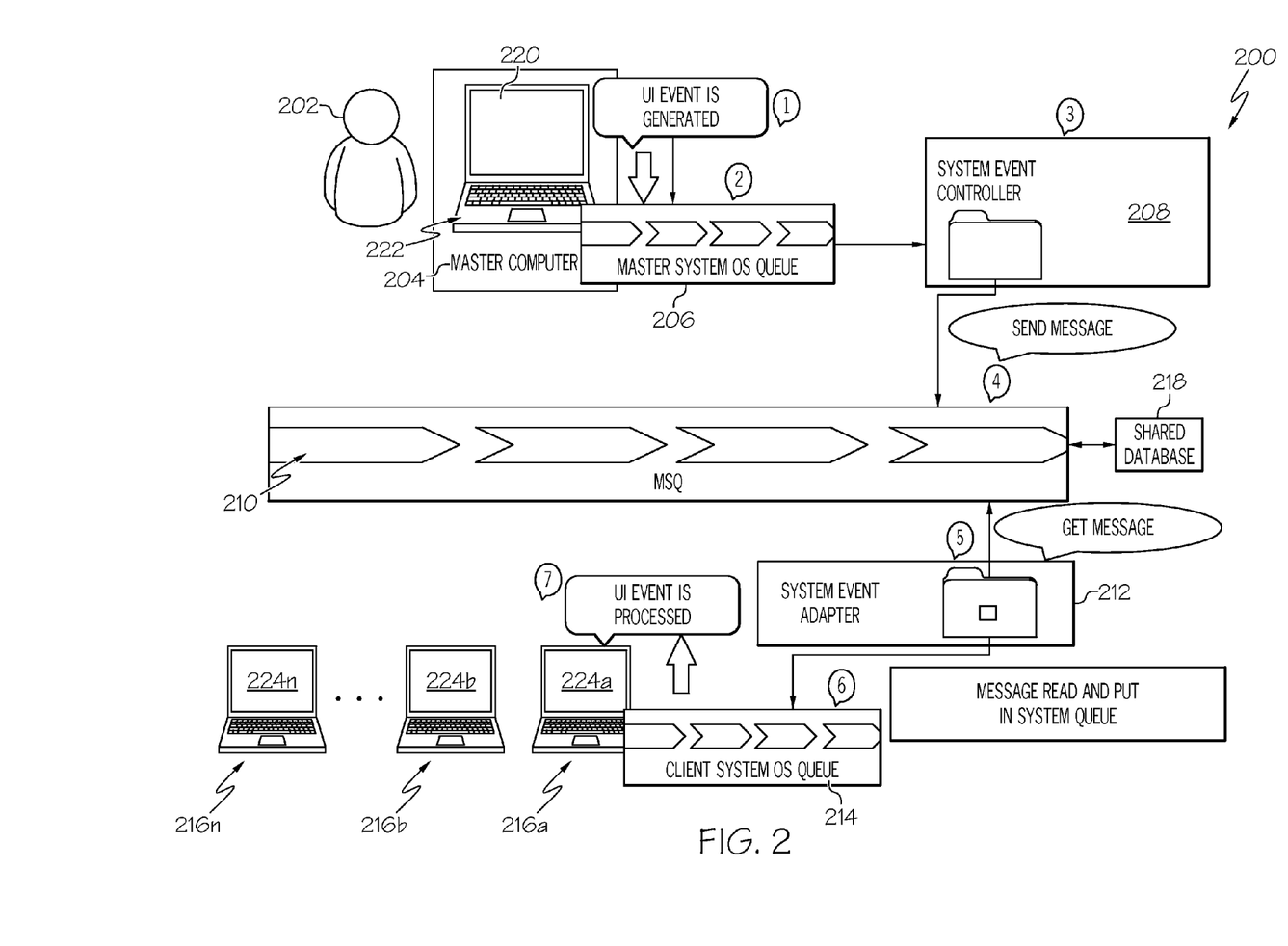
FIG. 2 illustrates an exemplary data flow between a master computer and a consumer computer describing User Interface (UI) initiated events on the master computer.

With reference now to FIG. 2, an exemplary data flow in system 200, between a master computer 204 and a consumer computer (i.e., one or more of the client computers 216a-216n, where "n" is an integer), which describe User Interface (UI) initiated events on the master computer 204 is presented. In one or more embodiments, the topology of system 200 is based on a "single Producer—multiple Consumers" model.

Thus, the event subscribers ("Consumers"—depicted as client computers 216a-216n) are Supervised Messaging Automation Framework (SMAF) event adapters (listeners), such as the system event adapter 212 depicted in FIG. 2. A separate system event adapter 212 runs at each instance of the applications or web client sessions environments (computers, virtual machines, etc.), including depicted client computers 216a-216n. The event publisher or "Producer" is the SMAF system event controller 208 running on the MASTER platform (i.e., on the master computer 204). In one or more embodiments, the operating system events are delivered through Message Queues (i.e., master system OS queue 206) using a publish/subscribe (pub/sub) mechanism, in which messages are published by the master computer 204 for retrieval by any authorized subscriber (i.e., one or more of the client computers 216a-216n). In one embodiment, the messages (describing the operating system events of the master computer 204) are delivered to a message queue (MSQ) 210 from tables in a shared database 218, which can be used for message sharing and/or PUB/SUB implementation of the present invention. In the embodiment in which a shared database 218 is used, messages stored in the shared database 218 are stored in the shared database 218, but not in the MSQ 210.

Continuing with FIG. 2, after capturing and recording operating system events that occur on the master computer 204 on a master system OS queue 206, the SMAF system event controller 208 publishes the event messages in a shared message queue (e.g., MSQ 210), which is accessible by both the master computer 204 and the client computers 216a-216n. The SMAF system event adapter 212 on each of the client computers 216a-216n is notified of the delivered event messages (that describe the UI-initiated action on the operating system of the master computer 204), gets the messages, processes them and puts these event messages on the client system queue OS 214. In one embodiment, this triggers execution of a consumer user interface controller action listener of an application under the test. Thus, system 200 creates a controlled concurrent action executions "farm" that is driven by a single UI interaction session at the "Master" computer (master computer 204). Master UI actions are thus replicated on all registered computers/virtual machines/etc.

The present invention thus provides multiple benefits over the prior art, including but not limited to: changes in the UI do not require manual modifications of the scripts; concurrent execution of the UI actions using latest deliverables is allowed; scalability; human interaction with the Master UI allows the user to apply context and reasonableness; concurrent actions on different data sets can be tested; and multi-user environment is emulated with minimum resource utilization. Note further that each of the subscribed computers (e.g., computers 216a-216n shown in FIG. 2) may operate on different operating systems. Nonetheless, the present invention is cross-platform compatible, even with the different operating systems. That is, computers 216a-216n may actually be different virtual machines, handheld devices, mobile phones, etc. (e.g., computer 216a is a virtual machine; computer 216b is a physical machine; computer 216n is a mobile phone, etc.; or computers 216a-216n may all be physical machines, but one or more of which are running a different operating system compared with the other physical machines) running different operating systems. Thus, the present invention creates a heterogeneous computers application "farm" that supports different OS(s) in multiple environments.

Depicted in FIG. 2 are the following SMAF functional components:

SMAF System Event Controller 208: this component captures system events that occur on the master computer 204, processes them, and publishes them to a queue (e.g., the message queue MSQ 210);

SMAF System Event Adapter 212: this component reads the delivered event messages (from MSQ 210), processes them, and places corresponding events in the client system OS queue 214;

Master UI 220: this is an instance of an application that has active UI user 202 or script that interacts with the master UI 220 and executes required UI actions. In some cases user actions can be substituted by executing test script recorded during a previous test session.

Thus, FIG. 2 depicts the data flow and components interaction of one or more embodiments of the present invention. The data flow follows the following steps:

Step 1. The user 202 performs some type of UI action on the master UI 220, such as moving a mouse, typing into a keyboard 222, etc. For example, consider FIG. 3, which depicts exemplary UI-initiated events on a UI from a master computer. This UI-initiated event may be a simple rearrangement of the master user interface (UI) 300, or the UI-initiated event may perform a more complex action. Any such UI-initiated event will be referenced as an operating system (OS) event, however, since the OS will be involved in all such UI-initiated events.

Figure 3:
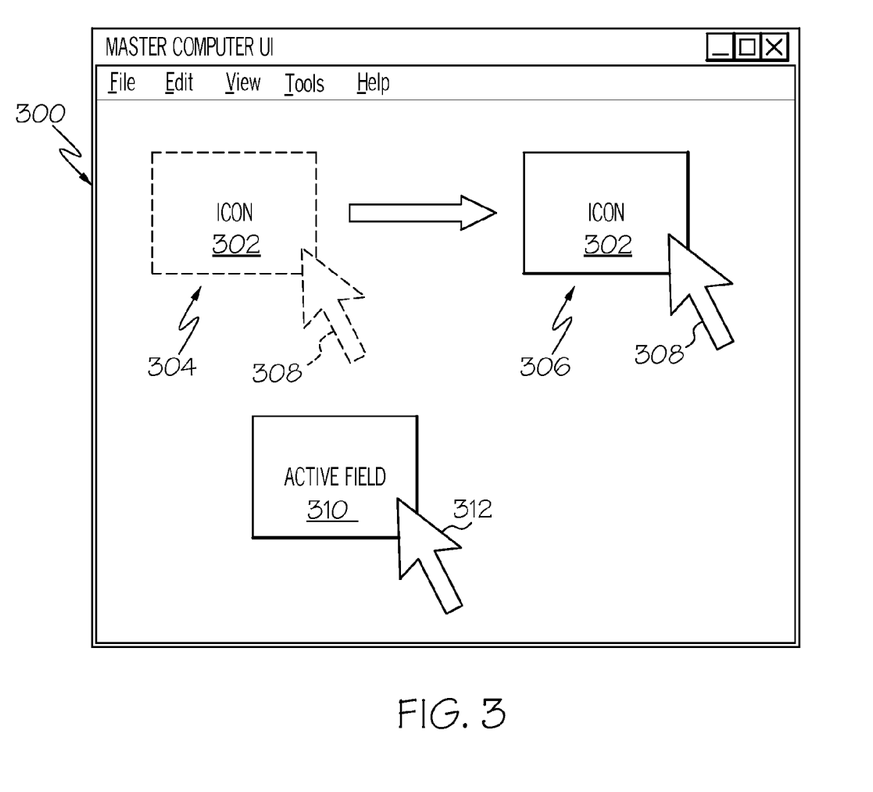
FIG. 3 depicts exemplary UI-initiated events on UI from a master computer.

For example, assume that a user uses a mouse to drag an icon 302 from a first position 304 to a second position 306 on the master UI 300 using a cursor 308. This is one example of a UI-initiated event that, through use of the system 200 depicted in FIG. 2, is replicated on one or more other computers 216a-216n, which may be real or virtual. Note that this is not a mere "remote control" of the user interfaces on the computers 216a-216n. That is, the present invention does not merely control applications and operating systems on remote computers, but rather changes the functionality of such remote computers by imposing upon them master UI-initiated operations that originate with the master computer.

Thus, with further reference to FIG. 3, assume that dragging the icon 302 from the first position 304 to the second position 306 changes the appearance of the master UI 300 by imposing a command on the OS of the master computer. This change to the OS on the master computer is then imposed on the OS of the client/customer computer. However, unlike remote control applications, the master is not taking an image of the remote client's OS and controlling the client thereby, but rather an image of the master computer's OS and UI are being imposed onto the client/customer computer(s).

The fact that the master computer's OS changes are being imposed on the client/customer computers is made more clear when movement on the master computer's UI results in more than mere rearrangement of icons. For example, assume that moving icon 302 from the first position 304 to the second position 306 on the master UI 300 causes a secondary action to occur. Examples of such secondary actions include, but are not limited to, enabling a local resource such as a local hard drive, printer, etc.; accessing a webpage; accessing a cloud resource (e.g., cloud resources 154 shown in FIG. 1, which include hardware and/or software resources that are on a cloud of distributed shared resources); activating a software application; etc. That is, moving the icon 302 may cause a hardware and/or software resource to become available to a user. Similarly, using the cursor 312 in FIG. 3 to click an active field 310 (e.g., a field that, when clicked, causes a resource to become available and/or start running) causes a secondary OS-based activity to occur.

Returning to FIG. 2, consider now:

Step 2. In this step, a (UI-initiated) operating system (OS) event is generated, and a message describing the UI-initiated OS event is placed in the master system OS queue 206.

Step 3. In this step, the SMAF system event controller 208 captures generated system messages from the master system OS queue 206 and records them in a local folder at the SMAF system event controller 208.

Step 4. In this step, the SMAF system event controller publishes the message (i.e., that describes the UI-initiated OS event in the master computer 204) to a message queue, such as a pub/sub MSQ 210.

Step 5. In this step, the SMAF system event adapter 212 (running on each subscribed computer) receives the message (from the MSQ 210) and processes it by 1) storing a copy in a local folder, and 2) forwarding the message on to a different client system OS queue 214 on each of the client computers 216a-216n. Thus, the SMAF system event adapter 212 generates corresponding System events based on the events details contained in the received message and in the format required by the underlying OS of the subscribed computer(s). Note that the SMAF system event adapter 212 places generated System events in the underlying System OS queue, such that each computer (subscribed device) has its own System OS queue. Thus, OS queues are not shared between the subscribed devices (client computers 216a-216n).

Step 6. In this step, the SMAF system event adapter 212 puts a corresponding system event message (which describes the UI-initiated OS event) in the client system operating system (OS) queue 214.

Step 7. In this step, UI controller listener action handlers 224a-224n trigger execution of OS events in respective client computers 216a-216n in response to detecting the event message. That is, each of the client computers 216a-216n has a resident UI controller listener action handler (i.e., one of the UI controller listener action handlers 224a-224n). When a particular UI controller listener action handler (from UI controller listener action handlers 224a-224n) detects the event message in the client system OS queue 214, that particular UI controller listener action handler then performs a UI/OS action that replicates that performed in the master computer 204 (and described in the message). In one embodiment, each of the client computers 216a-216n has its own client system OS queue 214. Thus, each client computer from client computers 216a-216n has its own OS System queue, which is not shared between computers. That is, each computer has its own OS queue, and each computer runs its own SMAF system event adapter 212 that processes the messages and generates corresponding OS events for placement on the OS System queue. However, even in the embodiment in which each computer has its own OS System queue, a single computer (having its own OS System queue on a particular OS) may still support multiple environments, such as different virtual machines (VMs). That is, a single OS/OS System queue can institute multiple VMs (e.g., software that functionally emulates a processor, storage device, etc.), each of which are a distinct environment as described in the present disclosure. Note further that the message from the MSQ 210 will identify which one or more of the multiple environments (e.g., client computer 216a-216n, VMs, etc.) is to replicate the UI/OS event that occurred at the master computer 204.

Thus, the system 200 depicted in FIG. 2 is applicable to multiple solutions, including but not limited to testing scenarios such as: health checks and verification checks at cloud continuous delivery; verification and regression to ensure backward compatibility; continuous code delivery-involved UI changes; and multi-platform testing. That is, a UI-initiated OS event that occurs on the master computer 220 can be propagated to multiple different environments, in order to see how a particular UI-initiated OS event affects these different environments.

Figure 4:
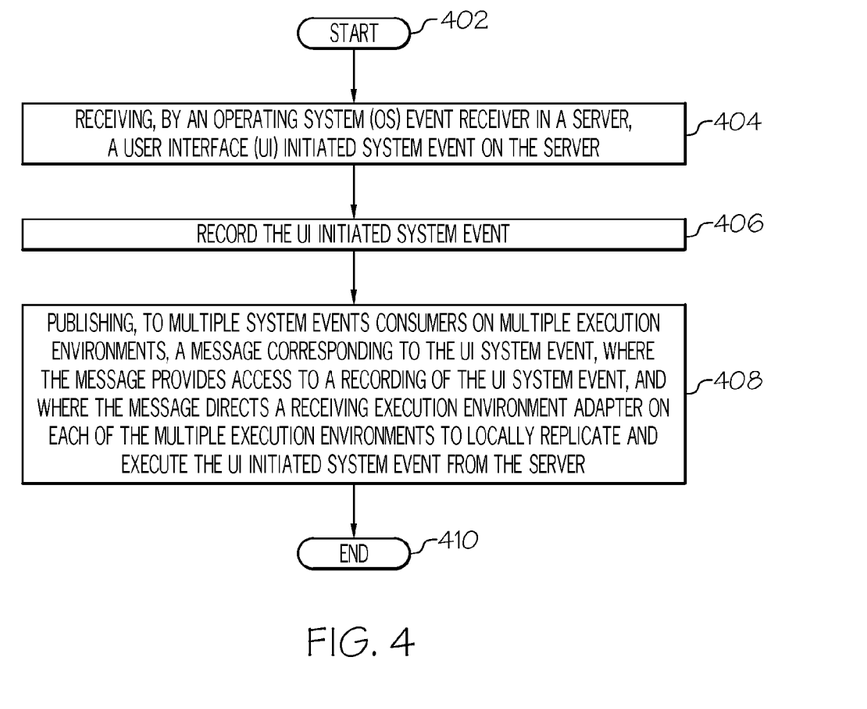
FIG. 4 is a high level flow-chart of one or more operations performed by one or more processors for distributing a user interface (UI) initiated system event, from a single producer of the UI-initiated system event, across multiple systems event consumers on multiple execution environments.

With reference now to FIG. 4, a high level flow-chart of one or more operations performed by one or more processors for distributing a user interface (UI) initiated system event, from a single producer of the UI-initiated system event, across multiple systems event consumers on multiple execution environments is presented.

After initiator block 402, an operating system (OS) event receiver (e.g., hardware that supports the master system OS queue 206 shown in FIG. 2) in a server receives a user interface (UI) initiated system event on the server, as described in block 404. Note that the server (e.g., master computer 204 in FIG. 2) is a single producer of the UI-initiated system event, which is initiated by an action on a UI of the server (e.g., moving a cursor, clicking an active field, etc.).

As described in block 406, in response to the OS event receiver receiving the UI-initiated system event, one or more processors then record (e.g., locally) the UI-initiated system event.

As described in block 408, in response to the OS event receiver receiving the UI-initiated system event, a message corresponding to the UI system event is published to multiple systems event consumers on multiple execution environments. As described herein, this message provides access to a recording of the UI system event (e.g., on the MSQ 210 shown in FIG. 2). Furthermore, the message directs a receiving execution environment adapter (e.g., system event adapter 212 shown in FIG. 2) to locally replicate and execute the UI-initiated system event from the server on each of the multiple execution environments. That is, the UI-initiated system event that occurred on the server is forced upon one or more of the multiple execution environments (e.g., client computers 216a-216n in FIG. 2).

The flow-chart ends at terminator block 410.

Note that in one embodiment, the multiple execution environments are disparate environments. For example, assume that a UI-initiated OS event on the master computer is clicking a particular icon. Assume further that one of the execution environments on which this icon clicking is replicated is a physical computer, another of the execution environments on which this icon clicking is replicated is a virtual computer, another of the execution environments on which this icon clicking is replicated is an LPAR, and another of the execution environments on which this icon clicking is replicated is a smart phone. Attempting to make the physical computer, the virtual computer, the LPAR, and the smart phone all click the same icon using prior technology would require writing environment-specific script for each of the execution environments. However, the present invention allows the master computer to utilize a single message, to a shared message queue, to direct each of the disparate execution environments to dynamically create their own script (using a local application such as SMAFP 148 shown in FIG. 1), thus replicating the UI-initiated OS event on each of the disparate execution environments.

In one embodiment of the present invention, the message describing the UI-initiated OS event is published to a publish and subscribe message queue (PUB/SUB MSQ), such as MSQ 210 in FIG. 2. Thus, each of the multiple execution environments that are subscribers to the PUB/SUB service is able/capable of retrieving the message from the PUB/SUB MSQ.

In one embodiment of the present invention, the message describing the UI-initiated OS event is recorded as a record in a shared database (e.g., shared database 218 in FIG. 2). This shared database is shared by and accessible to the single event producer (i.e., a single producer of one or more events, such as a master computer 220) and the multiple systems event consumers (e.g., client computers 216a-216n), as described herein.

In one embodiment of the present invention in which the multiple execution environments are from a group of computers (e.g., client computers 216a-216n in FIG. 2), the method further comprises directing the receiving execution environment adapter on each of the computers to locally replicate and execute the UI-initiated system event on a UI that is on each of the computers, as described herein.

In one embodiment of the present invention in which the multiple execution environments are from a group consisting of virtual machines (VMs) that each comprises a virtual receiving execution environment adapter and a virtual UI, and the method further comprises directing the virtual receiving execution environment adapter on each of the VMs to locally replicate and execute the UI-initiated system event on the virtual UI on each of the VMs.

In one embodiment of the present invention in which the multiple execution environments are a group consisting of logical partitions (LPARs), wherein each of the LPARs is a subset of computer hardware resources that is virtualized as a separate computer, wherein each of the LPARs comprises a virtual receiving execution environment adapter and a virtual UI, and the method further comprises directing the virtual receiving execution environment adapter on each of the LPARs to locally replicate and execute the UI-initiated system event on the virtual UI on each of the LPARs. Thus, in this embodiment, the UI-initiated OS event is not replicated on an entire system (real or virtual), but rather is executed only on a virtualized subset of the entire system.

In one embodiment of the present invention, in which the multiple execution environments are a group of application servers, and the method further comprises directing each of the application servers to locally replicate and execute the UI-initiated system event from the server, wherein locally replicated and executed UI-initiated system events cause an event to occur in one or more of the applications provided by the application server. Thus, by clicking the active field 310 in the master UI 300 in FIG. 3, a message is sent to each of the (client) application servers to perform some event related to a particular application. For example, assume that clicking the active field 310 on the master UI 300 for master computer 204 causes a particular application to be sent to other computers (e.g., some of the other computer(s) 152 shown in FIG. 1). Assume further that this particular application is provided by multiple application servers (equivalent to client computers 216a-216n in FIG. 2). Thus, when the master computer 204 sends this particular application to some of the other computer(s) 152, the UI-initiated event described in the message to the MSQ 210 causes these multiple application servers to send that particular application to other computers from other computer(s) 152 in FIG. 1.

In one embodiment of the present invention, in which the multiple execution environments are a group of database servers, the method further comprises directing each of the database servers to locally replicate and execute the UI-initiated system event from the server, wherein locally replicated and executed UI-initiated system events cause an event to occur in one or more of the databases provided by the database server. Thus, if the master computer 204 in FIG. 2 is a database server, then clicking an active field (e.g., active field 310 in the master UI 300 shown in FIG. 3) causes an event on the master computer 204, which causes all client database computers (e.g., client computers 216a-216n in FIG. 2) to execute the same event. Examples of such events include, but are not limited to, updating the databases in all of the client database computers, accessing the databases in all of the client database computers, etc.

In one embodiment of the present invention, multiple messages are transmitted to each of the multiple execution environments, wherein each of the multiple messages corresponds to a separate UI system event on the server. A message directing each of the multiple execution environments to record each UI system event from the multiple messages is transmitted as part of a series of UI system events. A message is then transmitted to each of the multiple execution environments, directing each of the multiple execution environments to test each of the multiple execution environments by retrieving and executing the series of UI system events. That is, in this embodiment, the UI-initiated OS events are a series of events (e.g., clicking on one area, dragging an icon to a certain spot, activating a resource by clicking on an icon, etc.). This series of events may be sequential or non-sequential. In either case (sequential/non-sequential), the same series of events is replicated in the other client computers to determine (test) how they react to such a series of events.

In one embodiment of the present invention, the multiple execution environments that replicate the UI-initiated OS system events from the master computer are tested for how the UI-initiated OS system events from the master computer affect each of the multiple execution environments. That is, as the replicated OS system events are integrated into the various (and in some embodiments, disparate in architecture, design, operating systems, etc.) execution environments, these replicated OS system events often have an impact on the performance of the execution environments. Thus, after the UI-initiated OS system events are replicated on the multiple execution environments, the multiple execution environments are tested for throughput changes, performance parameters (e.g., CPU usage, frequency of page swaps in memory, etc.), etc.

In one embodiment of the present invention, the series of UI system events (described in the paragraph above) are translated to corresponding OS events. The corresponding OS events are placed on at least one OS queue. The corresponding OS events are then consumed by event listeners on each of the multiple execution environments. That is, each UI-event initiates a particular OS action. For example, clicking an icon may cause the OS on the computer to open a port to access a webpage. These OS events are placed on an OS queue, which is consumed by event listeners (e.g., UI controller listener action handlers 224a-224n described in FIG. 2) for local handling.

As described herein is a method for producing and distributing operating system events across multiple execution environments, using a Supervised Messaging Automation Framework (SMAF). SMAF provides adaptable and scalable solution for concurrent testing UI across multiple environments, platforms and application versions. SMAF reduces concurrent GUI testing time and efforts and is suitable for testing continuously deliverable cloud applications. The design assumes "orchestrating" multiple concurrent execution instances/environments/from a single "MASTER" environment/computer. Thus, presented herein is a method and model for distributing operating system events messages across multiple execution environments by providing the ability to propagate operating system messages from a single active UI execution across multiple computers/virtual machines (VMs)/environments. The present invention presents a novel and useful process for capturing and propagating operating system events across multiple environments with active applications or web client sessions. As described herein, events can be propagated using pub/sub messages mechanisms, where messages received by event subscribers are processed and added to their operating system queues. Receipt of these messages in turn triggers the execution of remote application UI controller/listener action handlers, as described herein.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for distributing a user interface (UI) initiated system event, from a single producer of the UI-initiated system event, across multiple systems event consumers on multiple execution environments, the method comprising:
   receiving, by an operating system (OS) event receiver in a server, a user interface (UI) initiated system event on the server, wherein the server is a single producer of the UI-initiated system event, and wherein the UI-initiated system event is initiated by an action on a UI of the server;
   in response to the OS event receiver receiving the UI-initiated system event, recording, by one or more processors, the UI-initiated system event; and
   in response to the OS event receiver receiving the UI-initiated system event, publishing, to multiple systems event consumers on multiple execution environments, a message corresponding to the UI system event, wherein the message provides access to a recording of the UI system event, and wherein the message directs a receiving execution environment adapter to locally replicate and execute the UI-initiated system event from the server on each of the multiple execution environments.

2. The method of claim 1, further comprising:
   publishing, by one or more processors, the message to a publish and subscribe message queue (PUB/SUB MSQ), wherein each of the multiple execution environments are subscribers capable of retrieving the message from the PUB/SUB MSQ.

3. The method of claim 1, further comprising:
recording, by one or more processors, the message as a record in a shared database, wherein the shared database is shared by and accessible to the single producer and the multiple systems event consumers.

4. The method of claim 1, wherein the multiple execution environments are from a group of computers, and wherein the method further comprises:
directing the receiving execution environment adapter on each of the computers to locally replicate and execute the UI-initiated system event on a UI on each of the computers.

5. The method of claim 1, wherein the multiple execution environments are from a group consisting of virtual machines (VMs) that each comprises a virtual receiving execution environment adapter and a virtual UI, and wherein the method further comprises:
directing the virtual receiving execution environment adapter on each of the VMs to locally replicate and execute the UI-initiated system event on the virtual UI on each of the VMs.

6. The method of claim 1, wherein the multiple execution environments are a group consisting of logical partitions (LPARs), wherein each of the LPARs is a subset of computer hardware resources that is virtualized as a separate computer, wherein each of the LPARs comprises a virtual receiving execution environment adapter and a virtual UI, and wherein the method further comprises:
directing the virtual receiving execution environment adapter on each of the LPARs to locally replicate and execute the UI-initiated system event on the virtual UI on each of the LPARs.

7. The method of claim 1, wherein the multiple execution environments are a group of application servers, and wherein the method further comprises:
directing each of the application servers to locally replicate and execute the UI-initiated system event from the server, wherein locally replicated and executed UI-initiated system events cause an event to occur in one or more of the applications provided by the application servers.

8. The method of claim 1, wherein the multiple execution environments are a group of database servers, and wherein the method further comprises:
directing each of the database servers to locally replicate and execute the UI initiates system event from the server, wherein locally replicated and executed UI-initiated system events cause an event to occur in one or more of the databases provided by the database servers.

9. The method of claim 1, further comprising:
transmitting multiple messages to each of the multiple execution environments, wherein each of the multiple messages corresponds to a separate UI system event on the server;
transmitting a message directing each of the multiple execution environments to record each UI system event from the multiple messages as part of a series of UI system events; and
transmitting a message directing each of the multiple execution environments to test each of the multiple execution environments by retrieving and executing the series of UI system events.

10. The method of claim 9, further comprising:
translating the series of UI system events to corresponding OS events;
placing the corresponding OS events on at least one OS queue; and
consuming the corresponding OS events by event listeners on each of the multiple execution environments.

* * * * *